United States Patent [19]

Chen et al.

[11] Patent Number: 4,587,570

[45] Date of Patent: May 6, 1986

[54] STYLUS KICKER HAVING KICK ENERGY MINIMIZATION MEANS

[75] Inventors: Thomas Y. Chen, Flemington; Jon K. Clemens, Skillman; Victor Auerbach, Hamilton Sq., all of N.J.

[73] Assignee: RCA Corporation, Princeton, N.J.

[21] Appl. No.: 531,243

[22] Filed: Sep. 12, 1983

[51] Int. Cl.⁴ .................... H04N 5/76; G11B 21/08
[52] U.S. Cl. ................................ 358/342; 369/43; 369/219; 358/907; 360/10.1
[58] Field of Search .............. 358/907, 342, 312; 360/72.2, 10.1; 369/126, 43, 30, 32, 219, 220, 33, 41, 111

[56] References Cited

U.S. PATENT DOCUMENTS

| | | | |
|---|---|---|---|
| 3,872,498 | 3/1975 | Pritchard | 358/329 |
| 4,280,023 | 7/1981 | Christopher | 369/219 |
| 4,308,557 | 12/1981 | Dieterich | 358/342 |
| 4,330,879 | 5/1982 | Wine | 369/32 |
| 4,412,319 | 10/1983 | Taylor | 369/43 |

Primary Examiner—Alan Faber
Attorney, Agent, or Firm—P. J. Rasmussen; P. M. Emanuel; R. G. Coalter

[57] ABSTRACT

A video disc record system having a stylus for recovering information effects kicks which induce limited stylus translations across a disc record surface. Control circuitry responsive to a desired stylus translation are coupled to kicker means for inducing the stylus translation. Actual stylus translations are used to calibrate the kicker activation signals to minimize the kick used to induce stylus translations thereby reducing damage to the disc surface incurred during a stylus translation.

17 Claims, 9 Drawing Figures

STYLUS KICKER HAVING KICK ENERGY MINIMIZATION MEANS

This invention relates to a television apparatus for use in the playback of a video disc record and, more particularly, to apparatus for repositioning the signal pickup stylus from one convolution of a signal encoded information track disposed on the record to another convolution without damaging the surface of the record.

BACKGROUND OF THE INVENTION

In certain video disc systems, information is prerecorded on a video disc record in a spiral track or groove. The information is recovered by a track-following stylus which senses geometric variations of the track on the surface of the record as capacitive variations between a conductive electrode on the stylus and a conductive property of the record surface. In one preferable system the stylus is contoured to engage the spiral groove. The stylus is mounted to a stylus arm attached via a compliant coupling to a carriage assembly which is driven to translate the stylus radially across the disc during normal playback operations. The compliant coupling permits limited relative motion between the stylus and the carriage assembly.

In normal playback the stylus progresses along the groove in a continuous manner as the carriage assembly translates. In addition to the normal playback it is desirable to provide special effects controlled by the user or preprogrammed on a special disc for over-riding normal playback progression. These special effects may include repeat play of a single or plurality of groove convolutions or scanning. The special effects may be implemented by translating the stylus from one groove convolution to another. In a video disc system such as the RCA Model SGT350 it was thought that because the record tracks or grooves are shallow, i.e., in the order of 1 μm, and the stylus pressure low, e.g., 60–100 milligrams, little or no damage to the record would occur as the stylus crosses between convolutions during these special effect stylus translating operations. In fact, although this method does work, it has, on occasion, shown some tendency to damage the disc surface.

SUMMARY OF THE INVENTION

In accordance with the present invention the likelihood of producing disc defects during repeat play and other special effects wherein the stylus is kicked back to replay a convolution or set of convolutions is reduced. During a repeat play operation the video disc player outputs "kick pulses" which cause the player circuitry in combination with magnetic activator means to apply a mechanical "kick" impulse to the stylus, causing it to skip grooves. The energy of the kick impulse is approximately proportional to the kick pulse width. In accordance with one aspect of the present invention the kick pulse width is minimized to that value that just provides the desired groove skip. In accordance with this aspect of the invention the kick pulse width is reduced until the kick does not produce the desired stylus translation. Thus the kick pulse energy is reduced until the kick is not effected and then it is incremented one step to produce the desired kick effect. The reduced kick pulse energy causes a reduction in the kinetic energy of the stylus. It is felt that an excess of kinetic energy causes plastic deformation of the disc surface resulting in damage, thus the energy reduction minimizes such damage.

In accordance with another aspect of the present invention a video disc system is provided with a transducer for reproducing information signals recorded in a continuous track in a record medium. The video disc system includes kicker means, responsive to a control signal for initiating a play mode wherein a predetermined portion of the continuous track is repeated, for effecting translation of the transducer such that the transducer is kicked to effect the repeated play mode. Further, the system includes drive means for supplying energy to the kicker means to effect the translation of the transducer. The drive means which is responsive to the initiation of the control signal is decremented to reduce the energy to the kicker means on each successive translation of the stylus until the energy is insufficient to effect the transducer translation thereafter the drive means is incremented to increase the energy to the kicker means.

DETAILED DESCRIPTION OF THE INVENTION

Figure 1:
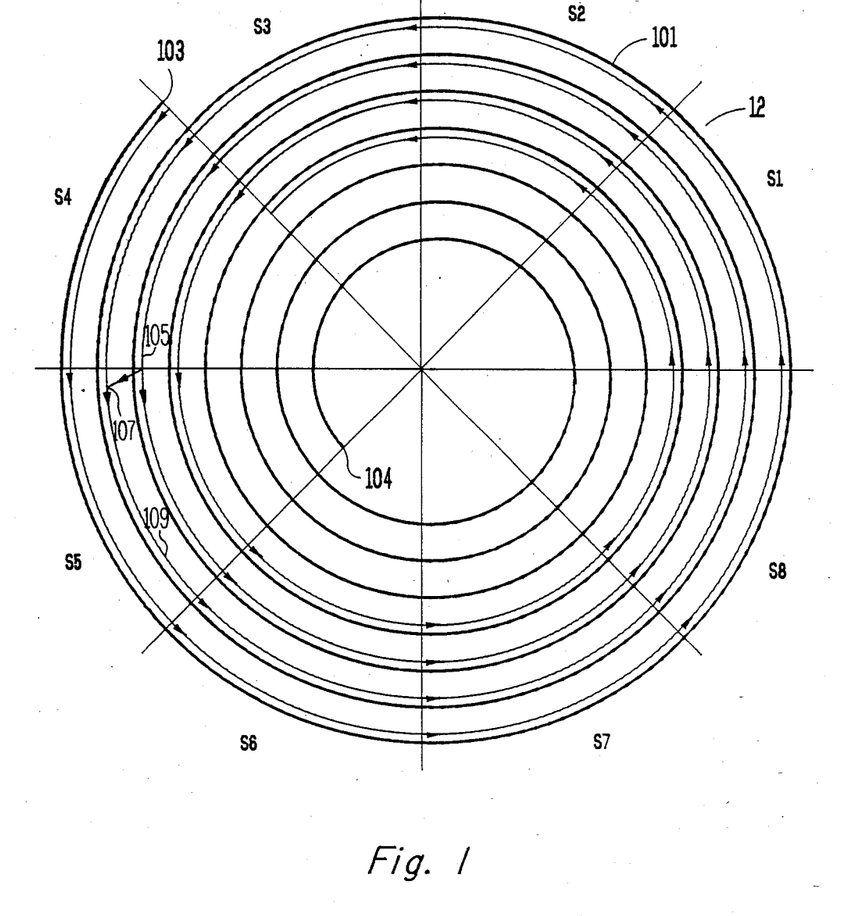
FIG. 1 is a plan view of a video disc record having a spiral track formed in accordance with the principles of the present invention.

Referring to FIG. 1, a disc record 12 for use in an interactive video disc player apparatus having a turntable that rotates at constant angular velocity is shown. Disc record 12 is divided into eight sectors S1–S8. The information on the disc record is recorded in a spiral track 101, which is continuous from starting point 103 to ending point 104, on the surface of disc record 12. Each convolution of track 101 is divided into eight segments corresponding to the eight sectors of the disc record. Each segment of track 101 has one complete field of television signal recorded therein, thus in disc 12 there are eight fields or four frames of television signal for 360° of information track or one revolution of the disc. The angular displacement for a field is 360°/8 or 45°, 90° for a frame. It should be noted that disc 12 of FIG. 1 is merely illustrative, other systems such as systems which have two or four fields per revolution could be used with the present invention.

Figure 2:
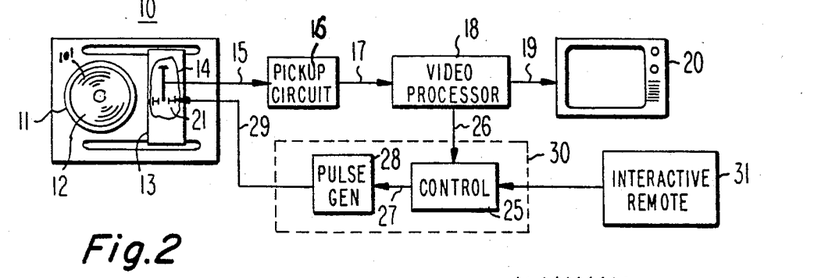
FIG. 2 is a block diagram of a record disc playback system including a stylus kicker mechanism.

Referring to FIG. 2, a video disc playback system is shown. Player 10 has a turntable 11 for rotatively supporting record disc 12. In the FIGURES, elements designated with like reference numerals are the same or similar items in the various FIGURES. Each convolution of spiral track 101 on disc 12 contains picture signal information inclusive of synchronization components and information identifying the particular convolution. A stylus assembly 14 including a signal pickup stylus is mounted in carriage mechanism 13 for radial translation of the stylus assembly across record 12. A kicker assembly 21 is mounted in close proximity to the pickup stylus for imparting motion to translate (kick) the stylus over one or more convolutions of track 101. Capacitance variations occurring between the stylus and the disc record are detected by pickup circuit 16 and are applied to video processor 18 to format the signal for display by conventional television receiver 20.

For special effects (i.e., interactive) the signal pickup stylus traces a path across the surface of disc 12 in accordance with the instructions provided by a user input from interactive remote control 31 and/or digital auxiliary information (DAXI) recorded along with the picture signal information. In other words, in an interactive mode, the stylus is kicked so that the video sequence recovered from the disc and displayed on receiver 20 is a sequence selected by the user or preprogrammed in the digital auxiliary information. The stylus is kicked in response to a kicking pulse from kicker assembly 21. A kicker mechanism 30 includes control circuitry 25 responsive to the DAXI recovered in video processor 18 and the instruction signal provided by interactive remote 31 (user input). Pulse generator 28 generates a pulse of appropriate length and/or amplitude to energize stylus kicker 21 to translate the stylus a desired number of convolutions. Control 25 establishes the kick necessary to accomplish the desired stylus translation.

An example of one special effect which may be practiced in accordance with the present invention will be described with reference to FIG. 1. In this example, assume that a particular sequence is recorded on disc 12 where the image that is recorded in a particular convolution of the spiral is to be displayed in a repeated fashion, for example, a stop motion special effect where the same television frame is repeated four times in one revolution. In this example the stylus follows spiral 101 from the starting point 103 in a normal progression across disc 12 until it reaches point 105. At point 105 control 25 in response to the DAXI decoded in video processor 18 and/or a user input from interactive remote 31 generates a skipper drive to condition the skipper transducer to return the stylus to point 107, the beginning of convolution 109. Thus track 109 is repeated to effectively freeze the TV picture recorded in that convolution. Under user control the repeat frame sequence may be stopped to return the player to normal playback.

Figure 3:
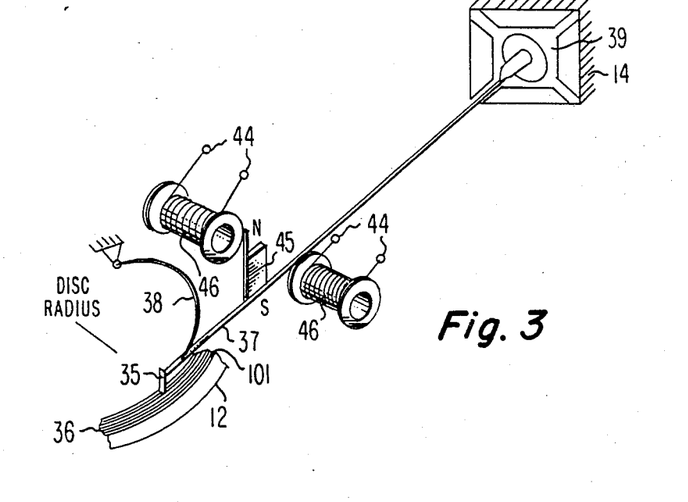
FIG. 3 is a diagrammatic representation of a stylus arm assembly having electromagnetic kicker apparatus.

The stylus kicker assembly will now be described with reference to FIGS. 3 and 4. FIG. 3 illustrates a stylus-kicker assembly. In one embodiment, stylus 35 having a signal pickup electrode thereon (not visible in FIG. 3) is contoured to engage a groove 36 in a spiral track 101 on record disc 12. Electrical contact to the electrode is made via flylead 38. The flylead 38 also produces a degree of pressure between the stylus and the record for tracking purposes. Stylus 35 is mounted to the free end of stylus arm 37 the opposite end of which is attached to carriage mechanism 14 via a compliant coupling 39 which permits limited freedom of movement of the stylus arm in three dimensions. A permanent magnet 45 is fixedly mounted to the stylus arm 37 and arranged to be in the magnetic field lines emanating from the selectively energized electrode magnets or coils 46 when the stylus is in the play position. The coils 46 having non-magnetic cores are electrically connected to produce aiding fields to apply a force to magnet 45 and consequently movement of the stylus radial to the disc along a disc radius line occurs when the coils are energized.

Figure 4:
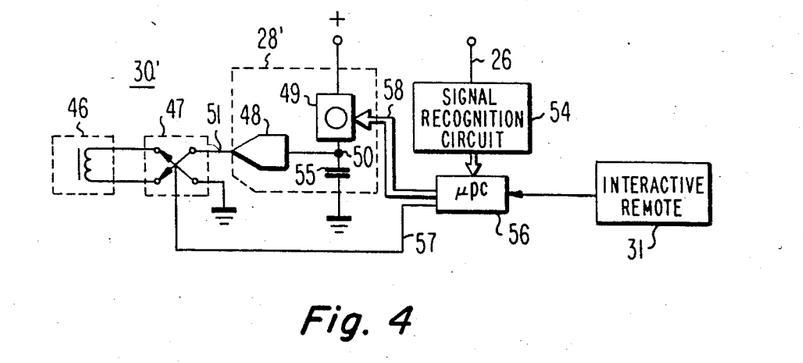
FIG. 4 is a block diagram of a stylus kicker system.

The partial schematic, partial block diagram of FIG. 4 illustrates a kicker system for player 10 of FIG. 2. In FIG. 4 a microcomputer 56, including the requisite associative circuitry for normal operation responsive to system or program commands from the player controls, monitors the stylus position via track identification signals (DAXI) and applies inward or outward kick signals in accordance with the mode of playback. For example, if a particular video sequence is to be "frozen", the stylus is kicked one convolution or track outward for each revolution of the disc so that the information in the "kick-back" convolution is repeated. The microcomputer 56 receives the track identification signals and interactive signals (DAXI) from recognition circuit 54. A user input from interactive remote 31 provided to microcomputer 56 is used to calculate the proper stylus position and determine the appropriate control signal adjustments to apply to the programmable pulse generator 28' to reposition the stylus in the direction of the proper or desired convolution of the spiral. Pulse generator 28' produces a ramp voltage proportional to the control signal applied by microcomputer 56 via input bus 58. The pulse generator output signal at connection 51 is applied to reversing switch 47 for application to the stylus kicker coil 46. The reversing switch 47, controlled by microprocessor 56 via bus 57, governs the direction of current flow through the stylus kicker coil 46 and thereby the direction of the magnetic field created between the coils and consequently the direction of stylus movement.

Pulse generator 28' includes a current source circuit 49 providing a high impedance regulated current in a first mode and a low impedance connection to a reference potential in a second mode. When current source 49 is operated in the second mode the potential across capacitor 55 is clamped at the reference potential. Switching current source 49 to its first mode causes the potential at connection 50 to monotonically increase in accordance with the charging rate of capacitor 55. The potential at connection 50 is buffered by amplifier 48 which generates the requisite range of output currents to drive stylus kicker coil 46.

Figure 5:
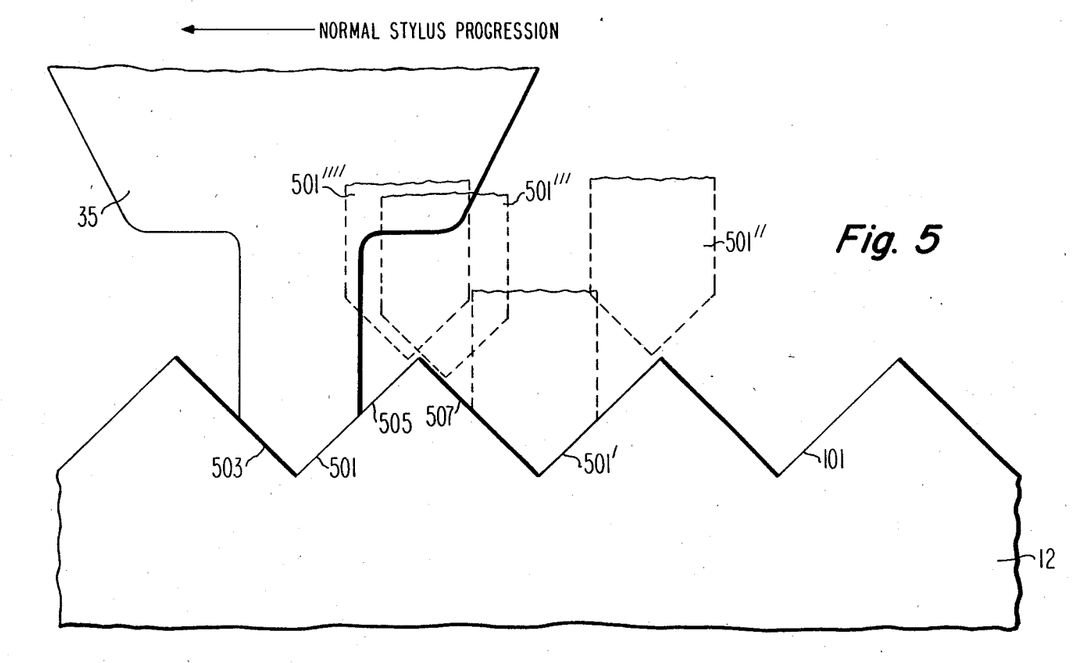
FIG. 5 is a diagrammatic representation of a video stylus tracking a conformal spiral groove in the surface of a video disc.

In one preferred embodiment of a video disc system, track 101 of disc 12 is formed as a groove on the surface of the disc having groove walls of a predetermined shape (e.g., triangular). Referring to FIG. 5, stylus 35 is provided with tip 501 which is conformal to the shape of groove 101 formed in disc 12. The conformal arrangement of the stylus and groove aids in tracking of the stylus across the disc surface and the engagement of the stylus during kicking operations. The triangular-shaped groove walls 503 and 505 guide stylus tip 501 so that it rides in the bottom of groove 101. In normal stylus progression the stylus tip 501 moves from right to left in FIG. 5. To effect a freeze or repeat mode of operation the stylus is kicked back to repeat a particular portion of the continuous track, in general, the stylus is kicked back one convolution for each rotation of the disc. In FIG. 5 stylus tip 501' is shown in phantom in the position it would occupy after a one groove kick from position 501. One of the advantages of a grooved disc record system is that the stylus tip will generally engage the selected groove so long as the bottom of stylus 35 lands within the width of the groove. Consequently, a continuously-servoed control loop is unnecessary, thereby avoiding the cost of a servo, the low speed of response and possibility of instability. On the other hand, however, one problem associated with a groove-type system is the potential, as discussed above, for disc damage during a stylus kick.

It has been discovered by applicants that disc damage from stylus kicks can be reduced to the point where one groove can be replayed over and over again for as long as a week without deleteriously damaging the disc due to the repeated kick. That is, by minimizing the kick pulse energy, disc damage during stylus kicks can be reduced to the point where it does not subjectively affect playback.

Referring again to FIG. 5, if the kick pulse energy is of such a magnitude that the stylus is kicked to the point shown by the phantom stylus tip 501″ the likelihood of damaging the groove is substantially greater than if the kick pulse energy kicks the stylus to the point shown by stylus tip in phantom 501‴. At point over groove wall 505 as shown by the phantom position 501″″ the stylus is captured by the adjacent groove wall 507 and will slide to the position shown by phantom tip 501′.

In accordance with the principles of the present invention, the kick pulse energy is decremented until the pulse energy is no longer sufficient to kick the stylus 501‴. At this point, i.e., where the stylus does not kick back one groove convolution in a freeze frame mode the energy of the stylus kick pulse is insufficient for the desired effect. Therefore on the next kick the energy is incremented one step. This incrementing process may be repeated if subsequent kick pulses have insufficient effect. After the kick pulse has been incremented it is not reminimized or reduced until the circumstances of the kick are changed on the disc surface, e.g., the player is put into a PAUSE or REJECT mode of operation. In general, it is believed that a continually minimizing method is not suitable because this would cause the player to periodically fail to achieve the desired kick effect.

Figure 6:
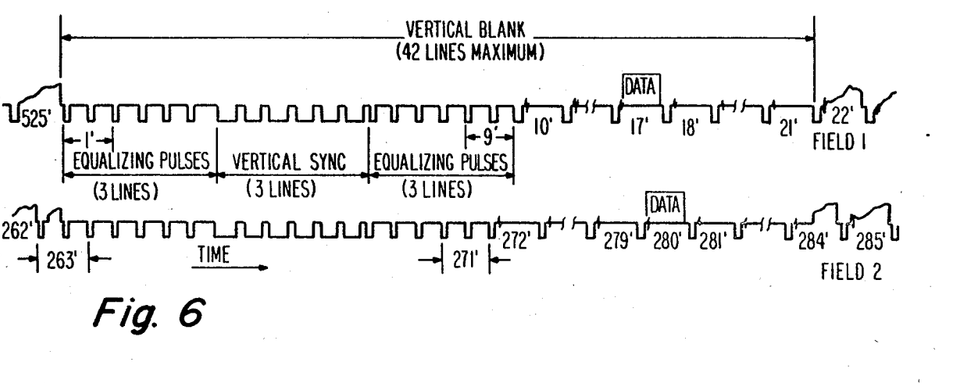
FIG. 6 is a waveform diagram of the vertical blanking intervals preceding odd and even fields of a television signal.
Figure 7:
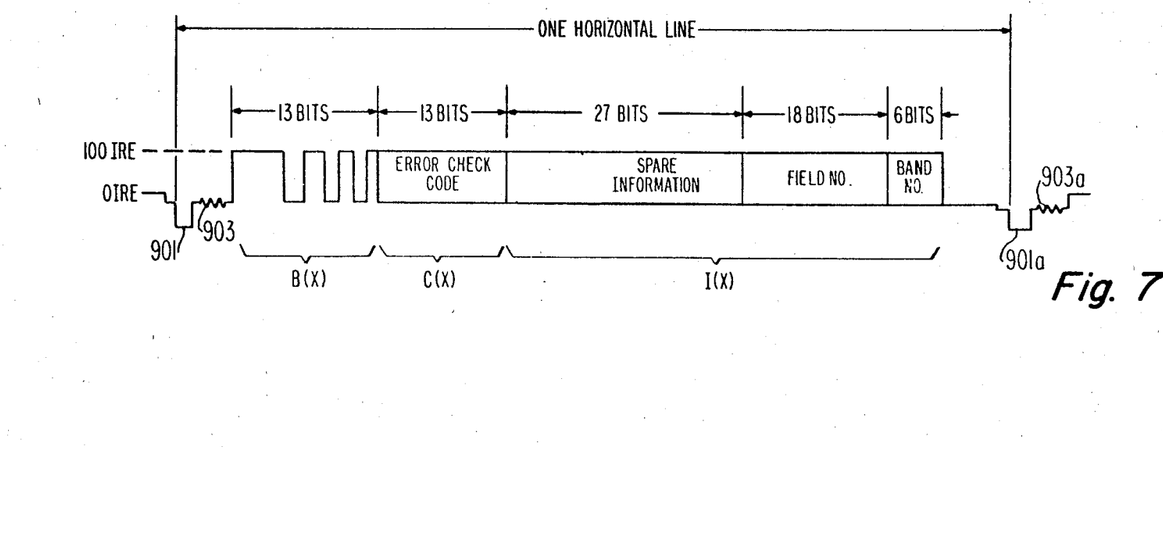
FIG. 7 is a representation of a digital data format used for controlling the stylus position in a video disc system.

FIGS. 6 and 7 will be used to describe the digital information (DAXI) recorded on the disc. Particular details of an NTSC type television signal for use in a video disc system formatted in accordance with the buried subcarrier technique are described in U.S. Pat. No. 3,872,498, entitled "Color Information Translating Systems", issued in the name of D. H. Pritchard. In accordance with the NTSC format a vertical blanking interval separates the interlaced odd and even fields of a television frame. Referring to FIG. 6 those skilled in the television arts will readily recognize the standard vertical blanking interval containing a first equalizing pulse interval, a vertical sync interval, a second equalizing pulse interval, followed by a number of horizontal line intervals at the start of each new field. The video signal information begins on line 22 of odd fields and on line 284 of even fields. The DAXI information representative of the field number and other information, such as special effects, appears at line 17 of odd fields and line 280 of even fields. Digital information could, as well, be inserted in other lines of the vertical blanking interval. To show the details of the DAXI signal format, FIG. 7 expands the time scale during the horizontal line containing data (i.e., lines 17 or 280).

Referring to FIG. 7, data are represented in terms of luminance level: 100 IRE units is a logical "1" and 0 IRE units (blank) is a logical "0". The first data bit follows the standard horizontal sync pulse 901 and color burst 903. The frequency of the color burst 903 is about 1.53 MHz, the frequency of the buried subcarrier. Each data bit is transmitted synchronously with the 1.53 MHz buried subcarrier signal. The digital message comprises a 13-bit start code termed B(X), and a 13-bit redundant error check code C(X), and 51 information bits termed I(X). The beginning of the next horizontal line is indicated by the next horizontal sync pulse 901a and color burst 903a. Thus, the individual data bits are synchronous with the color subcarrier, and the overall digital message is synchronous with the vertical sync pulse. Note that the data rate can be a multiple or submultiple of any convenient subcarrier frequency. Also, other values of luminance may be assigned to logic "1" and "0" or more than one bit may be associated with a given luminance level. Details of the start code B(X), the error check code C(X), the field number (18-bits) and the band number (6-bits) are provided in U.S. Pat. No. 4,308,557, entitled "Video Disc System", issued in the name of C. B. Dieterich. In a video disc system of a type described herein the field number may be used for track error correction. Further, the band number information can be multiplexed with flag information to provide information concerning special effects. For example, in even fields the six bits may identify a band number while on odd fields they could be used for flag information. In one illustrative system a predetermined bit in the flag information data may be used for identifying a freeze-frame mode. In this case where freeze-frame information comes from DAXI the freeze-frame may be exited by a user command.

Figure 8:
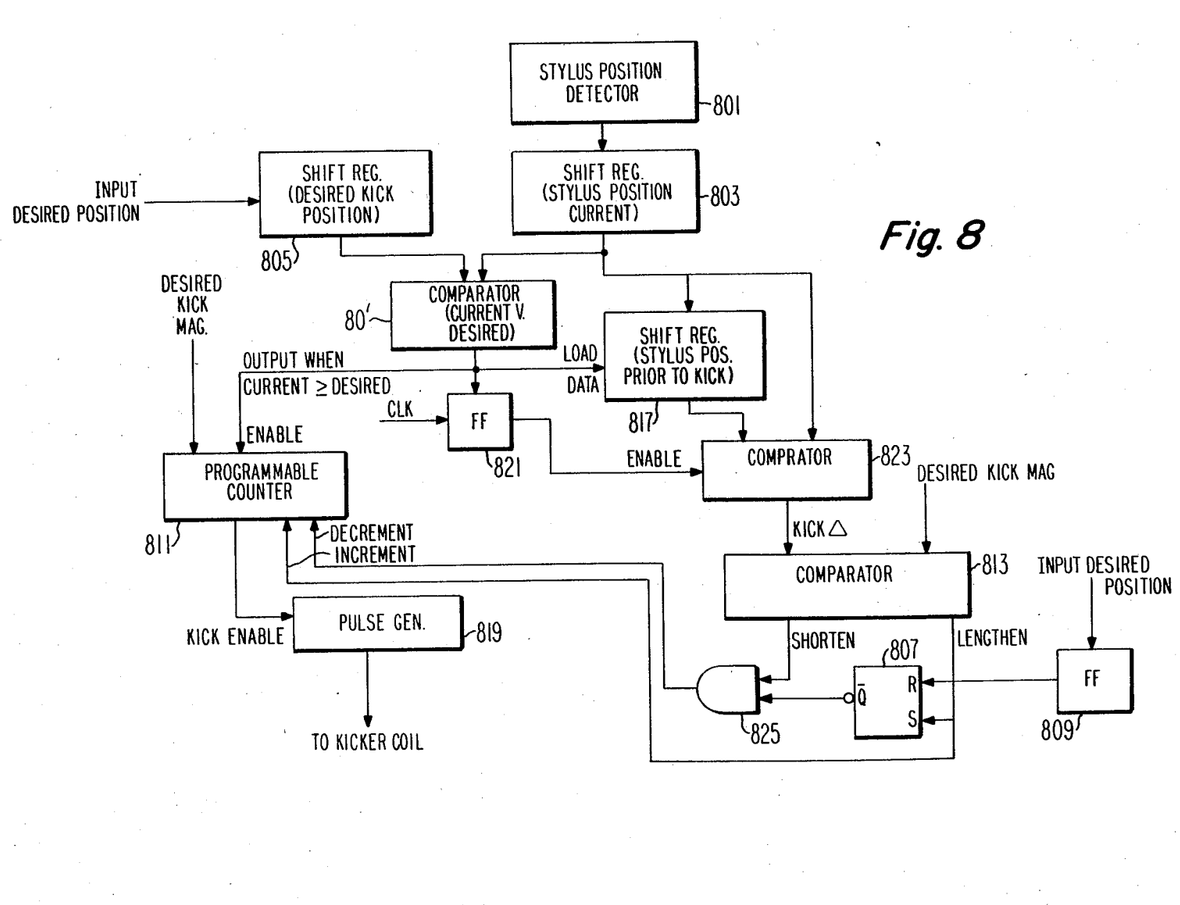
FIG. 8 is a hardware implementation of the kick pulse minimization technique formed in accordance with the principles of the present invention.

Referring to FIG. 8, a hardware implementation of the control and pulse generator apparatus of FIG. 2 is provided. The video disc processor 18 of FIG. 2 includes a stylus position detector which provides the current stylus position based on of the field number read from the 18-bits of the field number of the DAXI code. The current stylus position from block 801 is loaded into shift register 803. The arrangement of FIG. 8 will be explained in the case of a freeze-frame play mode. Assume that the desired position has been input into register 805 and used to reset flip-flop 807 via flip-flop 809 and the desired kick magnitude has been input into the programmable counter 811 and comparator 813. This information may be provided via the remote control or the initial kick magnitude may be derived from a ROM. The current stylus position is compared to the desired stylus position in comparator 815. If the current position is equal to or greater than the desired position, meaning that the stylus is now in or passed the sector on the disc where the kick is to be effected, the output of comparator 815 changes causing shift register 817 to load the current stylus position from shift register 803, i.e., the stylus position prior to the kick is loaded into shift register 817, and programmable counter 811 is enabled which, in turn, provides a count to pulse generator 819 coupled to the kicker coil. The pulse generator outputs a kick pulse related to the count from counter 811. Also when the output of comparator 815 changes, flip-flop 821 is enabled at the beginning of the next field by a clock pulse. Flip-flop 821 enables subtractor 823 such that after the kick has been effected and a new DAXI read has been made the kick magnitude is calculated. The kick magnitude (kick Δ) is determined by subtracting the current stylus position (in register 803 after the kick has been effected) from stylus position prior to the kick (in register 817) in subtractor 823. Subtractor 823 is enabled via flip-flop 821 to make the kick Δ calculation. The kick Δ is compared in comparator 813 with the desired kick magnitude. If the kick Δ is equal to or greater than the desired kick magnitude the "shorten" output of comparator 813 goes high. The "shorten" output is anded in AND gate 825 with the output from flip-flop 807 to provide an output to programmable counter 811 for decrementing the programmable counter to reduce the kick count thus reducing the kick pulse length. This cycle continues, that is, the kick pulse is shortened after each subsequent kick so long as the stylus is kicked back in the repeat frame mode, until the kick Δ is less than the desired kick magnitude as determined in comparator 813. At this point the "lengthen" output from comparator 813 goes high setting flip-flop 807 and incrementing counter 811 one step to increase the count from counter 811 to pulse generator 819, thus, increasing the pulse length to the kicker coil. Setting flip-flop 807 defeats any further decrementing after the kick pulse has been incremented thus effecting the minimization. Flip-flop 807 may be reset during playback of a particular disc if the circumstances of the kick are changed. In summary, the kick pulse length is shortened with each subsequent kick until the energy of the kick pulse is insufficient to cause the stylus to translate the desired magnitude. At that point the stylus kick pulse has been minimized thus the lengthen output from comparator 813 goes high to increment counter 811 to increase the energy of the kick pulse to kicker coil so that the stylus now kicks back the desired kick magnitude at the minimum energy necessary to effect the kick. It should be noted that nonlinearities in the kicking system may be such that kick pulse energy may have to be incremented several times before the desired kick is effected.

Figure 9:
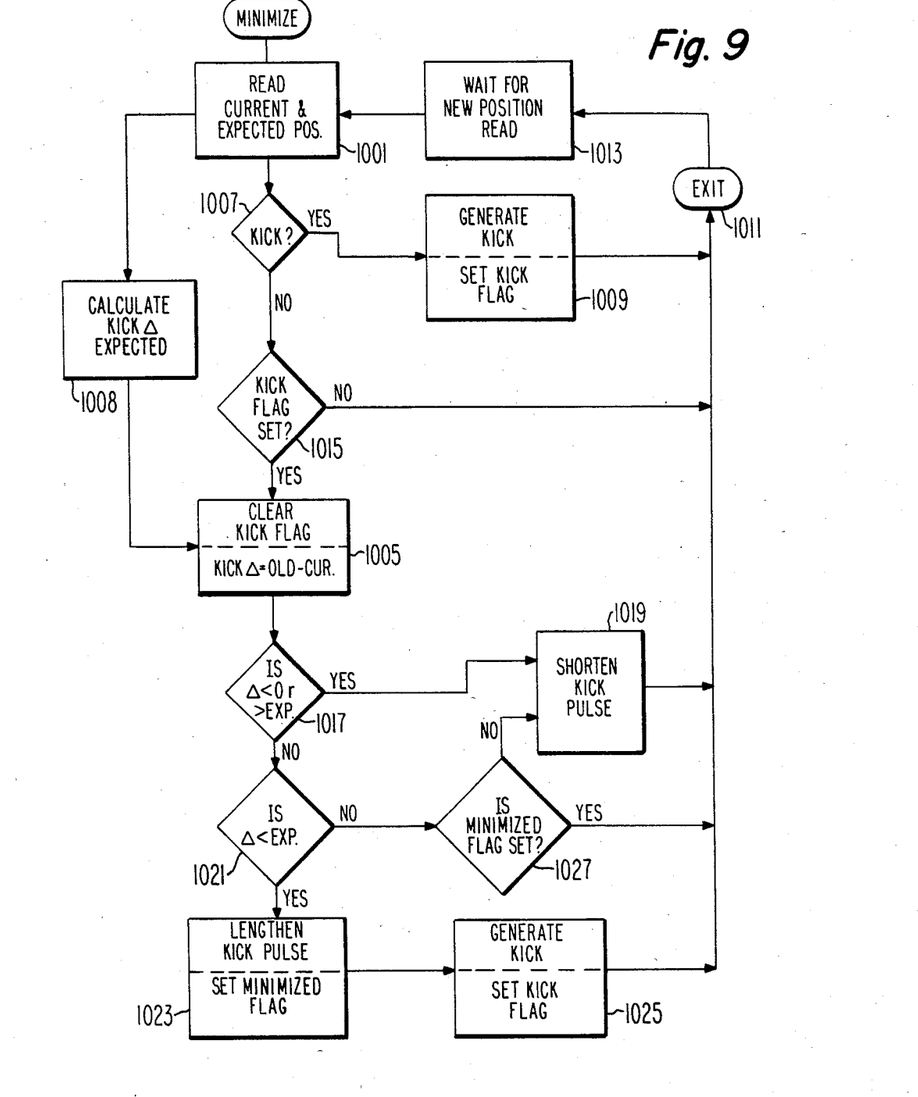
FIG. 9 is a flow chart illustrating a sequence by which the system of FIG. 4 effects the stylus kick minimization during a particular playback sequence in accordance with the principles of the present invention.

Referring to FIG. 9, another arrangement for the minimization routine is shown. FIG. 9 shows a flow diagram of a computer program suitable for use in the implementation of FIG. 4 where a micro-computer is used to control the pulse length. Again the minimization routine will be described with respect to a repeat frame or "freeze" frame operation. The routine described with respect to FIG. 9 does not include general system monitoring and kick control. This particular routine assumes that the stylus kicker arrangement for maintaining the proper groove is provided in accordance with U.S. Pat. No. 4,330,879, entitled "Adaptive Stylus Kicker Using Disc Track and Disc Sector Information" issued in the name of C. M. Wine. The first process block 1001 in the flow diagram instructs the microprocessor to read DAXI thus the current position of the stylus is read in process block 1001. Also the microprocessor is instructed to read the expected stylus position, i.e., the input from the user via interactive remote or the input from the band number in the DAXI code or an input from a ROM. After reading this information the expected kick Δ is calculated in process block 1003 and loaded into process block 1005 for use later in the processing sequence. Also after reading the current and expected stylus positions in process block 1001 first decision block 1007 is reached. In decision block 1007 the microprocessor determines whether a kick is necessary, i.e., is the stylus located in the sector where the kick is to be effected? If "yes" then process block 1009 is reached. In process block 1009 the kick is generated and a kick flag is set. After process block 1009 exit block 1011 is reached where general system monitoring and kick control is effected. The next process block is 1013, here the system goes into a waiting mode to wait for a new position read to procede in the program. If the response in decision block 1007 is "no" then decision block 1015 is reached. At decision block 1015 it is determined whether the kick flag has been set. If the kick flag has not been set then process block 1011 is reached. If the kick flag has been set then process block 1005 is reached. In process block 1005 the kick flag is cleared and the actual kick Δ, that is, the old stylus position minus the current stylus position, is calculated and compared to the expected kick Δ from decision block 1003. From process block 1005 decision block 1017 is reached. In decision block 1017 the question is whether the actual kick Δ is less than 0 which indicates that the kick was in the wrong direction or the actual kick Δ was greater than expected. If the response at decision point 1017 is "yes" then the kick pulse is shortened in process block 1019 and exit block 1011 is reached. If the response in decision block is "no" then decision block 1021 is reached. In decision block 1021 it is determined whether the actual kick Δ was less than the expected kick Δ. If the response is "yes" which indicates that the translation was too short then process block 1023 is reached wherein the kick pulse is lengthened and the minimized flag is set. From this point process block 1025 is reached where a stylus kick is generated to effect a kick immediately. In other words, it has been determined that the kick pulse was insufficient so a kick is generated to put the stylus in the correct groove. Further, the kick flag is set in block 1025. From process block 1025 the exit point 1011 is reached again. If the response at decision block 1021 had been "no", decision block 1027 is reached. In decision block 1027 it is determined whether the minimized flag has been set. If the response from decision block 1027 is "no" then the kick pulse is shortened in process block 1019 and the flow is to exit 1011. If the minimized flag had been set, i.e., the response is "yes", then the process is returned to the exit block 1011 for further processing.

The operation of FIG. 9 for the minimization routine includes blocks 1017, 1019, 1021, 1027, 1023 and 1025. These cooperate as follows: if the kick pulse is greater than expected which is determined in decision block 1017 then the kick pulse is shortened. This is continued until the kick pulse is shortened such that block 1021 is reached. If the response in decision block 1021 is "no", indicating that the kick pulse is equal to the expected value, then decision block 1027 is reached where it is determined whether the minimization flag has been set yet. If the flag has not been set then the kick pulse is shortened in process block 1019. When the actual kick Δ is less than the expected kick Δ which leads to process block 1023 then the kick pulse has been reduced below the minimum necessary to effect a kick. At this time the kick pulse is lengthened and the minimization flag is set since the kick pulse has been decremented until it no longer translates the stylus the desired amount. In process block 1023 the kick pulse is lengthened (incremented) to the minimized value. As stated above, nonlinearities may result in several lengthening increments being required to establish the minimization. It should be noted that process block 1025 effects a kick immediately to kick the stylus into the desired position. After minimization the loop includes the "no" branch of block 1021 and the "yes" branch of block 1027.

While the embodiments described include specific examples with respect to particular kick sequences these sequences are not meant to be limiting. For example, in a freeze-frame mode it may be desirable to kick back two convolutions in each kick instead of one. Further, it should be noted that the stylus kicking routines described herein have been described with reference to the stylus kicking outwardly on the disc. Of course, there are sequences wherein one may wish to skip inwardly on the disc and provide the kick at minimum energy.

What is claimed is:

1. In a video disc system having a transducer for reproducing information signals recorded in a continuous track in a record medium, an apparatus comprising:
   kicker means, responsive to a control signal for initiating a given play mode for effecting translation of said transducer such that said transducer is kicked to effect said play mode, said translation of said transducer tending to cause damage to said track during said given play mode; and
   drive means for supplying energy to said kicker means to effect said translation of said transducer in said given play mode, said drive means, responsive to the initiation of said control signal, being decremented to reduce the energy to said kicker means on each successive translation until said energy is insufficient to effect transducer translation thereafter said drive means being incremented to increase the energy to said kicker means until said energy is of a minimum value sufficient to effect said translation to reduce said tendency of said transducer to damage said track during said given play mode.

2. The apparatus according to claim 1 wherein said drive means is prevented from decrementing after said energy has been incremented.

3. The apparatus according to claim 2 wherein said continuous track is in the form of a spiral.

4. The apparatus according to claim 3 wherein said track is a groove formed in a surface of said record medium.

5. The apparatus according to claim 4 wherein the portion of said transducer which contacts said groove is conformal to the shape of said spiral groove and said transducer follows the path of said groove during normal playback.

6. In a video disc system having a transducer for reproducing information signals recorded in a spiral track in a disc-shaped record medium, said transducer being adapted, in a first reproducing mode, to translate radially across the surface of said record medium, an apparatus comprising:
   generating means for generating a control signal to effect a second reproducing mode, whereby said transducer is translated such that a predetermined convolution or convolutions of said track are repeated;
   positions means, responsive to a signal recovered from said record medium, for determining the position of said transducer with respect to said record medium;
   kicker means, responsive to said control signal, for effecting motion of said transducer to effect said second reproducing mode, said motion of said transducer tending to cause damage to said spiral track during said second reproducing mode; and
   drive means for supplying energy to said kicker means to effect transducer motion in said second reproducing mode, after the initiation of said second reproducing mode said drive means being decremented to reduce the energy to said kicker means on each successive translation until said energy is insufficient to effect said translation thereafter said drive means being incremented to increase the energy to said kicker means until said energy is of a minimum value sufficient to effect said translation to reduce said tendency of said transducer to cause damage to said spiral track during said second reproducing mode.

7. The apparatus according to claim 6 wherein said drive means is prevented from decrementing after said energy has been incremented.

8. The apparatus according to claim 7 wherein said spiral track is a groove formed in said surface of said record medium.

9. The apparatus according to claim 8 wherein the portion said transducer which contacts said groove is conformal to the shape of said spiral groove and said transducer follows the path of said groove during said first reproducing mode.

10. In a video disc system having a transducer for reproducing information signals recorded in a spiral track in a disc-shaped record medium, said transducer being adapted, in a first reproducing mode, to translate radially across the surface of said record medium, an apparatus comprising:
    generating means for generating a control signal to effect a second reproducing mode, whereby said transducer is translated across said surface of said record medium;
    position means, responsive to a signal recovered from said record medium, for determining the position of said transducer with respect to said record medium;
    kicker means, responsive to said control signal, for effecting said translation of said transducer to effect said second reproducing mode, said translation of said transducer tending to cause damage to said spiral track during said second reproducing mode;
    drive means for supplying energy to said kicker means to effect transducer translation in said second reproducing modes; and
    microcomputer means, responsive to said position means, for adjusting said drive means such that said energy to said kicker means is minimized, said drive means being decremented to reduce the energy to said kicker means of each successive translation until said energy is insufficient to effect said translation thereafter said drive means being incremented to increase the energy to said kicker means until said energy is of a minimum value sufficient to effect said translation to reduce said tendency of said transducer to cause said damage to said spiral track during said reproducing mode.

11. The apparatus according to claim 10 wherein said drive means is prevented from decrementing after said energy has been incremented.

12. The apparatus according to claim 11 wherein said spiral track is a groove formed in said surface of said record medium.

13. The apparatus according to claim 12 wherein the portion said transducer which contacts said groove is conformal to the shape of said spiral groove and said transducer follows the path of said groove during said first reproducing mode.

14. In a video disc system having a transducer for reproducing information signals recorded in a continuous spiral groove in a record medium, an apparatus comprising:

kicker means, responsive to a control signal for initiating a given play mode wherein said transducer is kicked across a wall of said groove as a part of said play mode, for effecting translation of said transducer when said transducer is kicked during said given play mode, said translation of said transducer tending to damage said wall of said groove during said given play mode; and drive means for supplying energy to said kicker means to effect said translation of said transducer in said given play mode, said drive means, responsive to the initiation of said control signal, being decremented to reduce the energy to said kicker means on each successive translation until said energy is insufficient to effect transducer translation thereafter said drive means being incremented to increase the energy to said kicker means until said energy is of a minimum value sufficient to effect said translation to reduce said tendency of said transducer to damage said groove wall during said given play mode.

15. The apparatus according to claim 14 wherein said drive means is prevented from decrementing after said energy has been incremented.

16. The apparatus according to claim 15 wherein said spiral groove is formed in a surface of said record medium.

17. The apparatus according to claim 16 wherein the portion of said transducer which contacts said groove is conformal to the shape of said spiral groove and said transducer follows the path of said groove during a normal playback mode.

* * * * *

UNITED STATES PATENT AND TRADEMARK OFFICE
CERTIFICATE OF CORRECTION

PATENT NO. : 4,587,570

DATED : May 6, 1986

INVENTOR(S) : Thomas Yuan-Ge Chen, Jon Kaufmann Clemens and Victor Auerbach

It is certified that error appears in the above-identified patent and that said Letters Patent is hereby corrected as shown below:

Column 5, lines 24-25, after "point" delete --over groove wall 505 as shown by the phantom position--.

Column 5, line 25, change "501''''" to --501'''--.

Column 5, line 30, after "stylus" insert --over groove wall 505 as shown by the phantom position--.

Column 5, line 31, change "501'''" to --501''''--.

Signed and Sealed this

Twenty-sixth Day of August 1986

[SEAL]

Attest:

Attesting Officer

DONALD J. QUIGG

Commissioner of Patents and Trademarks